United States Patent
Scholtz et al.

(10) Patent No.: US 9,337,662 B2
(45) Date of Patent: May 10, 2016

(54) PARALLEL COMPUTATION OF DYNAMIC STATE ESTIMATION FOR POWER SYSTEM

(71) Applicant: ABB Research Ltd., Zurich (CH)

(72) Inventors: Ernst Scholtz, Houston, TX (US);
Vaibhav D. Donde, Cary, NC (US);
Jean-Charles Tournier, Bellegarde (FR)

(73) Assignee: ABB Technology AG, Zurich (CH)

( * ) Notice: Subject to any disclaimer, the term of this patent is extended or adjusted under 35 U.S.C. 154(b) by 463 days.

(21) Appl. No.: 13/832,670

(22) Filed: Mar. 15, 2013

(65) Prior Publication Data
US 2013/0338841 A1 Dec. 19, 2013

Related U.S. Application Data

(60) Provisional application No. 61/660,073, filed on Jun. 15, 2012.

(51) Int. Cl.
*H02J 4/00* (2006.01)
*H02J 3/06* (2006.01)
*H02J 3/00* (2006.01)

(52) U.S. Cl.
CPC ... *H02J 4/00* (2013.01); *H02J 3/06* (2013.01); *H02J 2003/007* (2013.01)

(58) Field of Classification Search
None
See application file for complete search history.

(56) References Cited

U.S. PATENT DOCUMENTS

| | | | |
|---|---|---|---|
| 6,917,124 B2 | 7/2005 | Shetler, Jr. et al. | |
| 7,155,623 B2 | 12/2006 | Lefurgy et al. | |
| 7,861,102 B1 | 12/2010 | Ranganathan et al. | |
| 8,065,022 B2 | 11/2011 | Minto et al. | |
| 8,150,640 B2 | 4/2012 | He et al. | |
| 2011/0106321 A1 | 5/2011 | Cherian et al. | |
| 2011/0213606 A1* | 9/2011 | Seaman et al. | 703/18 |

(Continued)

FOREIGN PATENT DOCUMENTS

WO 2008097458 A1 8/2008

OTHER PUBLICATIONS

Scholtz, E. "Observer-Based Monitors and Distributed Wave Controllers for Electromechanical Disturbances in Power Systems." Thesis, Massachusetts Institute of Technology. Dept. of Electrical Engineering and Computer Science, pp. 1-246, Aug. 23, 2004, Cambridge, MA, USA.

(Continued)

*Primary Examiner* — Sean Shechtman
*Assistant Examiner* — Steven Garland
(74) *Attorney, Agent, or Firm* — Taft Stettinius & Hollister LLP (57) ABSTRACT

Techniques are disclosed for performing the estimation and/or prediction of the dynamic system state of large power system networks, using a multi-processor approach. More particularly, a large power system network is divided into smaller sub-systems, each sub-system having associated dynamic state variables. Each sub-system is assigned to one or more of a plurality of processing elements, and dynamic state variables for each sub-system are estimated or predicted independently, using the processing elements and sensor measurements. In several embodiments, the dynamic state of each sub-system is computed through the construction of a set of dedicated observers, such as linear parameter-varying (LPV) observers, which are designed to reduce the effects of other sub-systems on the state estimation problem.

22 Claims, 3 Drawing Sheets

(56) References Cited

U.S. PATENT DOCUMENTS

2012/0123602 A1\* 5/2012 Sun et al. ............... 700/292
2012/0283967 A1 11/2012 Duan et al.

OTHER PUBLICATIONS

Carvalho, J.B. et al. "A Parallel Algorithm to Power Systems State Estimation." POWERCON '98, 1998 International Conference on Power System Technology, Proceedings, Aug. 18-21, 1998, pp. 1213-1217, vol. 2, Beijing, China.

Chang, J. et al. "Dynamic State Estimation in Power System using a Gain-Scheduled Nonlinear Observer." Proceedings of the 4th IEEE Conference on Control Applications, Sep. 28-29, 1995, pp. 221-226 Albany, NY, USA.

Debs, A.S, et. al. "A Dynamic Estimator for Tracking the State of a Power System." IEEE Transactions on Power Apparatus and Systems, Sep. 1970, pp. 1670-1678, Vol. Pas-89, No. 7.

El-Keib, A.A et al. "Parallel State Estimation in Power Systems." Twenty-Second Southeastern Symposium on System Theory, 1990, Mar. 11-13, 1990, pp. 255-260, Cookeville, TN, USA.

Falcao, D.M. et al. "Parallel and Distributed State Estimation." IEEE Transactions on Power Systems, May 1995, pp. 724-730, vol. 2, No. 2.

Liu, Y. et al. "Distributing Power Grid State Estimation on Hpc Clusters a System Architecture Prototype." 2012 IEEE 26th International Parallel and Distributed Processing Symposium Workshops & PhD Forum (IPDPSW), May 21-25, 2012, pp. 1467-1476, Shanghai, China.

Monticelli, A. "State Estimation in Electric Power Systems a Generalized Approach." May 31, 1999, pp. 1-13, Kluwer Academic Publishers, Norwell, Massachusetts, USA.

Scholtz, E. et al. "Graphical Observer Design Suitable for Large-scale DAE Power Systems," Proceedings of the 47th IEEE Conference on Decision and Control, pp. 2955-2960, Dec. 9-11, 2008, Cancun, Mexico.

Shih, K-R. et al. "Application of a Robust Algorithm for Dynamic State Estimation of a Power System." IEEE Transactions on Power Systems, Feb. 2002, pp. 141-147, vol. 17, No. 1.

Wallach, Y. "An Efficient Parallel Processing Method for Power System State Estimation." IEEE Transactions on Power Apparatus and Systems, Nov. 1981, pp. 4402-4406, vol. Pas-100, No. 11.

\* cited by examiner

PARALLEL COMPUTATION OF DYNAMIC STATE ESTIMATION FOR POWER SYSTEM

RELATED APPLICATIONS

This application claims the benefit of and priority to U.S. Provisional Application Ser. No. 61/660,073, filed 15 Jun. 2012. The entire contents of said U.S. Provisional Application are incorporated herein by reference.

BACKGROUND

State estimation is a central application for the management of a power system network. Two types of state estimators, namely, static and dynamic, are possible for realization. Traditionally, static state estimation techniques are used by the electric power industry to estimate the state of power transmission and distribution systems, due to the relative simplicity of the techniques and the ready availability of supervisory control and data acquisition (SCADA) data, which is often obtained at relatively slow sampling rates. Dynamic state estimation, on the other hand, would allow power system operators to observe and respond to transient state changes in the power system, and is likely to become more relevant with the increasing availability of fast-sampled sensor data, such as phasor measurement unit (PMU) data.

Some approaches to dynamic state estimation of large-scale power systems are based on the use of model-based filtering techniques, which include techniques based on dynamic observers, such as linear parameter-varying (LPV) dynamic observers or proportional-integral (PI) observers. Observer-based power system monitors can be used to estimate the complete state of a power transmission and distribution system, as well as to identify and isolate a number of events (e.g., faults), using only sparse local measurements, all in the presence of various system disturbances. One such approach, based on the graphical design of LPV dynamic observers, is described in detail by E. Scholtz and B. C. Lesieutre, "Graphical Observer Design Suitable for Large-scale DAE Power Systems," Proceedings of the 47$^{th}$ IEEE Conference on Decision and Control, Cancun Mexico, Dec. 9-11, 2008, pp. 2955-60 (hereinafter referred to as "the Scholtz and Lesieutre article"), the complete disclosure of which is incorporated by reference for all purposes.

Dynamic state estimation promises significant advantages compared to the static estimation approach, including higher accuracy and an ability to capture the dynamics of the network. On the other hand, dynamic state estimation for monitoring and control purposes requires real-time (or faster than real-time) simulation of the system models, which are generally more complex than the static state models and thus involve greater computational complexity. While the computational requirements for dynamic state estimation can be manageable for relatively small power transmission and distribution networks, these increased computational requirements can make it prohibitively expensive or even impossible to compute the solution in a timely manner using conventional techniques, for large networks.

SUMMARY

Embodiments of the present invention include processes and apparatus for performing the estimation and/or prediction of the dynamic state of large power system networks, using a multi-processor approach. More particularly, in several embodiments a large power system network is divided into smaller areas, or sub-systems, which may be connected through well identified tie lines. The dynamic state estimation problem of each resulting sub-system, or "island," is then solved independently, using one or more processing units of a multi-processor system. In some embodiments, the dynamic state of each area, or sub-system, is computed through the construction of a set of dedicated observers, such as linear parameter-varying (LPV) observers, which are designed to reduce the effects of other sub-systems on the state estimation problem.

An example method according to several embodiments of the invention is for monitoring the state of a power system network that includes one or more power generators, multiple power buses, and multiple monitoring sensors. This example method begins with the dividing of the power system network into several sub-systems, followed by the assigning of each of the sub-systems to one or more of multiple processing elements. Each sub-system has a plurality of associated dynamic state variables—the method continues with the estimating or predicting of the associated dynamic state variables for each sub-system at real-time speeds or faster, using the multiple processing elements and measurements from the monitoring sensors. This estimating or predicting for each sub-system is independent of the estimating or predicting for the other sub-systems.

In some embodiments, the dividing of the power system network into the several sub-systems is based on one or more of the following: the number of state variables in the power system network; the number and locations of monitoring sensors in each potential sub-system; a processing capability for one or more of the processing units; and the number of processing units available. In several embodiments, the estimating or predicting the associated dynamic state variables for each sub-system is based on the modeling of the sub-system using a dynamic observer, the dynamic observer including a designed-observer gain that attenuates effects on the estimated dynamic state variables from unknown state estimates for other sub-systems. This dynamic observer is a proportional integral (PI) dynamic observer, in some embodiments, or a linear parameter-varying (LPV) dynamic observer, in others. In some cases, the method further includes designing the LPV dynamic observer for each of the sub-systems using a graphical observer design approach.

In some embodiments, two or more of the processing elements are processor cores in a multi-processor apparatus. The processing elements may also be distributed among two or more processing platforms; these processing platforms may be single-processor or multi-processor platforms, or a combination of both. In some cases, the number of sub-systems is selected to match a number of available processing elements.

In some embodiments, one or more parameters in the power system network are controlled, based on the estimated or predicted dynamic state variables. In some of these and in other embodiments, a system operator may be alerted to a system disturbance based on the estimated or predicted dynamic state variables.

Further embodiments of the invention include a computerized system configured to carry out one or several of the techniques summarized above. Those skilled in the art will recognize still further embodiments, as well as additional features and advantages of several of these embodiments, upon reading the following detailed description and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

In the claims and discussion that follow, terms such as "first", "second", and the like, are used to differentiate between several similar elements, regions, sections, etc., and are not intended to imply a particular order or priority unless the context clearly indicates otherwise. Furthermore, as used herein, the terms "having", "containing", "including", "comprising" and the like are open-ended terms that indicate the presence of stated elements or features but that do not preclude additional elements or features. Likewise, the use of the singular articles "a", "an" and "the" are not intended to preclude the presence of additional ones of the referenced item. Like terms refer to like elements throughout the description.

As discussed above, power system state estimation has been focused traditionally on static estimation of system states, using redundant measurements made throughout the system. Accordingly, the commonly implemented instances of power system state estimation in the electric utility industry are based on the static state estimation approach.

A fundamental assumption behind static state estimation is, of course, that the system is in a steady state of operation. As a result, however, static state estimation techniques do not allow a monitor to "see" fast movements in system behavior.

A dynamic state estimation approach allows dynamic changes in system state to be observed. Much of the technical literature on dynamic state estimation discusses the recursive processing of systems measurements (multi-snap-shot estimation) or describes techniques to track slowly varying dynamics due to load variations. However, many of these techniques still use a static model of the system, coupled to load forecasting. Lacking in these techniques for system state estimation is the ability to observe and respond to a true transient state of the system. The ability to monitor and respond to transient state changes in real-time or near real-time is crucial to deriving true benefits from fast-sampled data from PMU's and for subsequent applications of wide-area monitoring and control systems.

A dynamic state estimation approach that considers a dynamic model of the power system is discussed in the Scholtz and Lesieutre article cited above. While the details of that article are specifically addressed to a model based on generator swing dynamics, the dynamic state estimation techniques described therein are generalizable to the modeling of other system dynamics or other algebraic formulations of the system, such as load dynamics. The approach discussed in the Scholtz and Lesieutre article is based on the use of dynamic observers, which are a special kind of filter designed to track and predict system behavior. These dynamic observers are designed using graphical techniques and Linear Matrix Inequalities (LMI).

While dynamic state estimation can estimate a transient state of the system the dynamic observer requires a real-time (or faster than real-time) simulation, since it needs to run in real time. A "real-time" simulation, in the present context, is a simulation in which the amount of actual time used to solve the equations representing a system during a given simulation time-step is equal to the actual wall-clock duration of the simulation time-step. In a "faster-than-real-time" simulation, the actual time required to solve all equations representing the system during a simulation time-step is less than the actual wall-clock duration of the simulation time-step. In the context of monitoring an ongoing process, faster-than-real-time simulation allows the simulator to look ahead, and predict the monitored system's behavior.

For a large system, real-time simulation can present a considerable challenge for the computational tools and hardware that are traditionally used for power system analysis. In several embodiments of the present invention, this challenge is addressed with the use of a many-core processor platform. More particularly, a large dynamic state estimation problem can be addressed by first splitting the power generation and distribution system of interest into smaller areas, or sub-systems, that each can be solved more easily. Simulation techniques to allow these smaller sub-systems to be solved independently of one another are used, so that effects of the sub-system interdependencies are minimized.

With this approach, real-time (or faster than real-time) simulation is still needed to permit effective monitoring and/or control of the system. However, the simulation is now performed separately and in parallel for each of the resulting sub-systems, each of which is substantially smaller than the total system. This parallel simulation process fits the execution paradigm for many present and evolving many-core processors, and is also suitable for distributed processing, in that the simulations of the separate simulations can be performed on entirely separate processing platforms, whether co-located with the simulated network or remotely located in a processing "cloud."

A principal application of the techniques described herein is for the estimation of dynamic states of a power system network. These techniques may improve the power system network monitoring, analysis and control performed by Energy Management Systems (EMS) and Distribution Management Systems (DMS) in a power system control center, for example.

Figure 1:
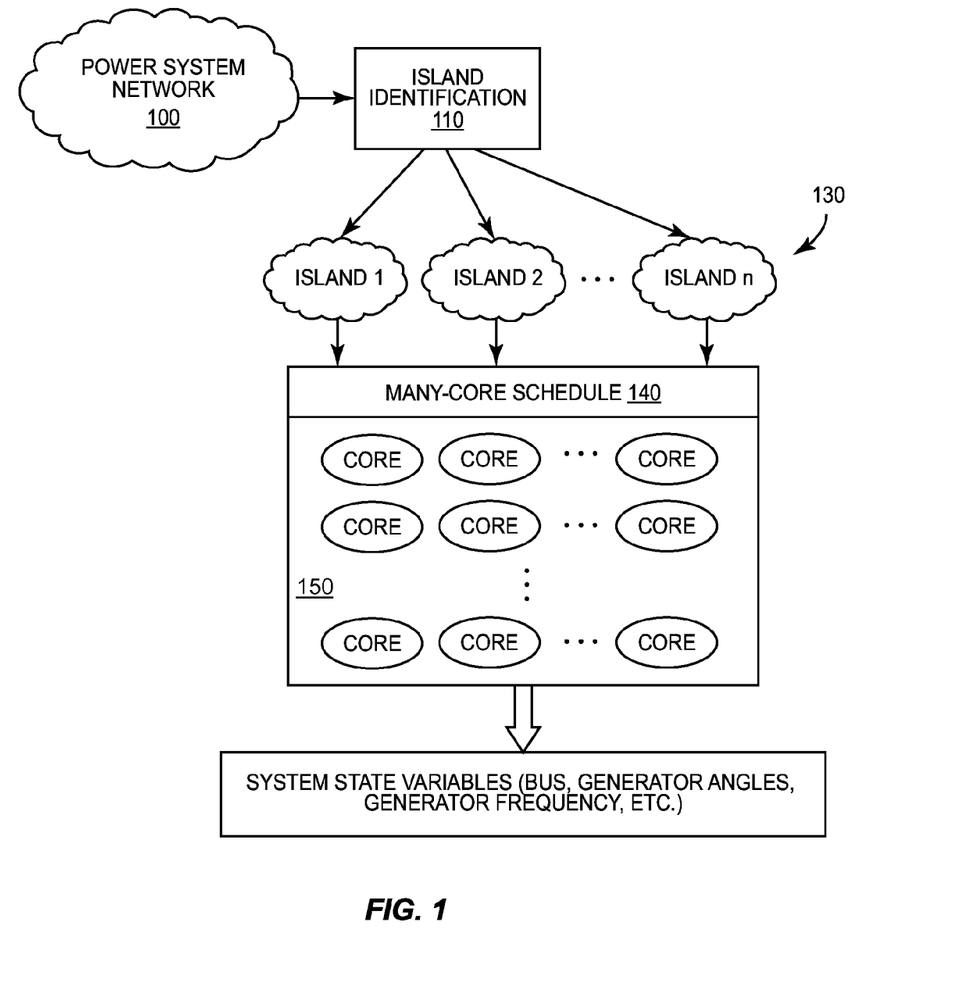
FIG. 1 is a block diagram providing an overview of a parallel dynamic state estimation system.

FIG. 1 illustrates generally an approach to monitoring the state of a power system using these techniques. Power system network 100 includes one or more power generators, many power buses, and several sensors, such as PMUs, distributed throughout the network. Using modeling techniques such as those described in the Scholtz and Lesieutre article cited above, system network 100 is amenable to dynamic state estimation as a whole, using sensor information, known system parameters, and the like. However, power system network 100 may be too large and complex for real-time simulation using a single processor. Accordingly, as shown at block 110, power system network 100 is divided into several smaller sub-systems or "islands" 130. Each sub-system or island 130 is then modeled separately, in a manner that minimizes or eliminates interdependencies between the separate sub-systems.

A many-core scheduler, shown at block 140 in FIG. 1, allocates the separate sub-system models to the separate processing cores of a multi-core/many-core processing system. A dynamic state estimation for each of the sub-systems is then performed independently on one of the cores of the many-core platform 150. The many-core scheduler is responsible for distributing the work load among the different cores. This distribution is especially important when the number of cores is smaller than the number of sub-systems. To balance the load as evenly as possible, the scheduling operation can be based on the size of the sub-systems, the number of measurements, or the processing capability of the various cores in the case of a non-homogeneous platform. It is worth noting that this system can be completely distributed, e.g., where all processing elements are not located on the same physical platform, and where each core is actually a single computer, such as might be used in a classical high-performance computing (HPC) architecture or cluster environment.

Figure 2:
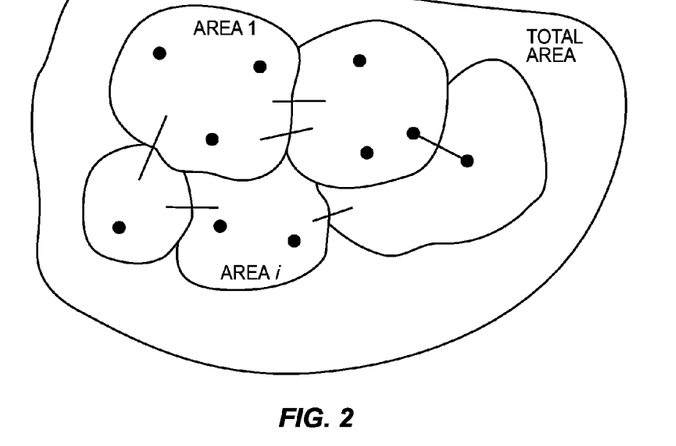
FIG. 2 illustrates the division of a power system network into sub-systems.

To address the process described generally above in more detail, first consider a power system where the transmission system that is considered for dynamic state estimation is split into various smaller areas, i.e., sub-systems. FIG. 2 illustrates this schematically, where each area, corresponding to a sub-system, contains a number of measurements, shown as dots. The various sub-systems are linked with one another via tie lines that run across area boundaries. This is shown schematically in FIG. 2.

Power system dynamics exhibited by a power system such as the system illustrated conceptually in FIG. 2 can be represented in the general form:

$$\dot{x} = f(x, u, p), \quad (1)$$
where $$x = \begin{bmatrix} x_1 \\ \vdots \\ x_i \\ \vdots \\ x_k \end{bmatrix}, f = \begin{bmatrix} f_1 \\ f_2 \\ f_3 \\ \vdots \\ f_k \end{bmatrix} + \begin{bmatrix} \vdots \\ f_{ij} \\ \vdots \end{bmatrix}. \quad (2)$$

The inputs to function $f$ include vector x, which is a vector of system state variables, such as bus or generator phase angles, generator frequencies, etc. Vector u represents the known system inputs, such as generator mechanical power inputs, while vector p includes system parameters, such as transmission line model parameters, and the like.

Function $f$ can be separated into two parts, the first representing the terms that contain variables/parameters/inputs due to the concerned area itself, and the second capturing inter-area effects due to the tie lines between sub-systems. These are represented herein as $f_i$ and $f_{ij}$, respectively, where i indexes a sub-system of interest and j indexes a subsystem tied to the sub-system of interest. In a real system, the tie lines, and hence the associated terms, are necessarily bounded in number. In the discussion that follows, system parameters associated solely with one system are represented by $p_i$, while system parameters associated with a tie line between sub-systems i and j are represented by $p_{ij}$.

The goal is to efficiently estimate the dynamic system states represented by vector x. A Linear Parameter Varying (LPV) observer of the form given in equations (3) and (4) can be designed to realize the dynamic state estimation of each sub-system i.

$$\dot{\hat{x}}_i = f_i(\hat{x}_i, u_i, p_i) + f_{ij}(\hat{x}_i, \hat{x}_j, p_{ij}) + L(y_i - \hat{y}_i) \quad (3)$$

$$\hat{y}_i = C_i \hat{x}_i \quad (4)$$

In these expressions, a variable with a "hat," e.g., $\hat{x}$, represents an estimate of the corresponding variable. A variable with a "dot," e.g., $\dot{x}_i$, represents the time-derivative of the variable. The first term of equation (3), $f_i(\hat{x}_i, u_i, p_i)$, gathers together state variables, system inputs, and system parameters for a subsystem i of interest. The second term, $f_{ij}(\hat{x}_i, \hat{x}_j, p_{ij})$, includes state variables and system parameters corresponding to adjoining sub-systems j. The third term, $L(y_i - \hat{y}_i)$, is a dynamic observer gain function. The variable $y_i$ represents system measurements for sub-system i. As will be appreciated by those familiar with LPV observer design, the form given in equations (3) and (4) is an example; alternative, similar descriptors or state-space forms might be used to characterize each sub-system instead. The Scholtz and Lesieutre article cited above and a dissertation by E. Scholtz, "Observer based Monitors and Distributed Wave Controllers for Electromechanical Disturbances in Power Systems," Ph.D. Dissertation, MIT, September 2004 (hereinafter the "Scholtz dissertation," available at http://dspace.mit.edu/bitstream/handle/1721.1/26723/59669742.pdf), the complete disclosure of which is incorporated by reference for all purposes, provide general discussions of and the mathematics behind LPV dynamic observers. The references cited therein provide further background to dynamic observer based approaches to system simulation.

For a reasonably large power system, e.g., a system having one hundred or more buses, the total system model represented by equations (3) and (4) can be quite large. This large mathematical model needs to be simulated in real time or faster to obtain dynamic state estimates for the system. Parallel processing can provide substantial assistance. However, this parallel processing can be hampered if the separated processing tasks are not independent.

Notice that the second term of equation (3), $f_{ij}(\hat{x}_i, \hat{x}_j, p_{ij})$, is a function of state estimates from other sub-systems, e.g., from areas "j". This implies that state estimates from these other areas must be obtained, which means that coordination between the subsystem modeling processes would be required. However, the processing of each sub-system model can in fact be made independent of the other sub-systems by viewing this second term as a contributor to the unknown input for the sub-system of interest. The aim then becomes to design the last term in equation (3), $L(y_i - \hat{y}_i)$, so as to attenuate the effects of the second term, $f_{ij}(\hat{x}_i, \hat{x}_j, p_{ij})$. If this last term $L(y_i - \hat{y}_i)$ is properly designed for each sub-system, the modeling of all the sub-systems or areas becomes independent, with the intersection coupling effects being included in each sub-system model as unknown inputs. This provides the ability to process each sub-system or area independently of other sub-systems in parallel, and hence faster.

By defining the state error as $e_i = x_i - \hat{x}_i$, where $\hat{x}$ represents a current estimate of $x_i$, and noting that $y_i = C_i x_i$, the associated linearized error dynamics for each area i are obtained:

$$\dot{e}_i = A_i|_{\hat{x}_i} e_i + E_i w_i - L_i C_i e_i \quad (5)$$

$$\Rightarrow \dot{e}_i = (A_i - L_i C_i) e_i + E_i w_i \quad (6)$$

The aim is to design an LPV dynamic observer as in equations (3) and (4), through the identification of $L_i$ such that the effects of the second term $E_i w_i$ in equation (6) are attenuated. The term $E_i w_i$ is obtained from the terms $f_{ij}(\hat{x}_i, \hat{x}_j, p_{ij})$ and $f_{ij}(x_i, x_j, p_{ij})$, both of which are unknowns with respect to the model for section i. Such a dynamic observer can be designed using the graphical observer based design techniques discussed in the Scholtz and Lesieutre article and the Scholtz dissertation cited earlier.

It is worth reemphasizing that equations (5) and (6) only contain quantities that are known with respect to the model for sub-system i. That is, the observer for each sub-system is self-sufficient to estimate the sub-system's states under the correct observability conditions for this smaller sub-system. Thus, the dynamic states can be estimated for each section independently of other areas. This enables the execution of system dynamic state estimation on a many-core hardware platform.

Following is a brief example of a three bus system that is split into two subsystems. While this example system is very simple, the techniques highlighted here can be extended to much larger systems.

Figure 3:
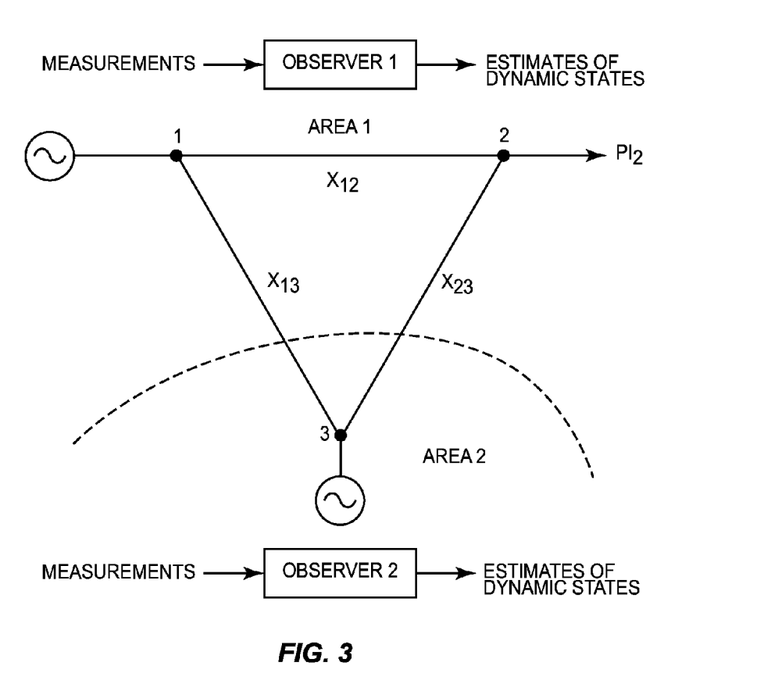
FIG. 3 is a schematic diagram illustrating an example of a power system network including a generator and three buses.

FIG. 3 illustrates this three bus system, which is split into two subsystems, or areas. The sub-system of area 1 contains a generator and a load at buses 1 and 2 respectively. The sub-system of area 2 contains a generator at bus 3.

A system description for the system of FIG. 3, in terms of generator swing dynamics and power balance equations, is given by the systems of equations (7), (8), and (9) as follows.

First, area 1 includes a generator at bus 1 and a load at bus 2. The generator at bus 1 can be modeled by the system of equations (7):

$$\dot{\delta}_1 = \omega_1$$

$$M_1\dot{\omega}_1 = -D_1\omega_1 + (P_{M1} - P_{e1})$$

$$P_{e1} = X_{12}(\delta_1 - \delta_2) + X_{13}(\delta_1 - \delta_3), \quad (7)$$

where $\delta_j$ is the phase angle at bus j and $\omega_k$ is the angular frequency of generator k. The second equation in system (7) is based on the pendulum equation and relates the mechanical power input ($P_{M1}$) to the to the electrical power output ($P_{e1}$) for the generator. The variables $M_1$ and $D_1$ represent the mass and damping constant, respectively, for the pendulum analogue to the generator at bus 1. The third equation relates the phase angles at buses 1 and 2 to the electrical power output by the generator. Xij represents the transmission line reactance for the tie line between buses i and j.

Next, the load at bus 2 is represented by equation (8):

$$P_{l1} = X_{12}(\delta_1 - \delta_2) + X_{23}(\delta_3 - \delta_2). \quad (8)$$

Moving to area 2, the generator at bus 3 is modeled in a similar manner to the generator in area 1, as shown in the system of equations (9):

$$\dot{\delta}_3 = \omega_3$$

$$M_3\dot{\omega}_3 = -D_3\omega_3 + (P_{M3} - P_{e3})$$

$$P_{e3} = X_{13}(\delta_3 - \delta_1) + X_{23}(\delta_3 - \delta_2). \quad (9)$$

The state, input and parameter vectors for the system illustrated in FIG. 3 can be defined as follows:

$$x = \begin{bmatrix} x_{1,1} \\ x_{1,2} \\ x_{1,3} \\ \ldots \\ x_{2,1} \\ x_{2,2} \end{bmatrix} = \begin{bmatrix} \delta_1 \\ \omega_1 \\ \delta_2 \\ \ldots \\ \delta_3 \\ \omega_3 \end{bmatrix}; u = \begin{bmatrix} u_{1,1} \\ \ldots \\ u_{2,1} \end{bmatrix} = \begin{bmatrix} P_{M1} \\ \ldots \\ P_{M3} \end{bmatrix} \text{ and } p = \begin{bmatrix} X_{12} \\ X_{13} \\ X_{23} \end{bmatrix}. \quad (10)$$

Next, the dynamic observer for each area is designed. For clarity of presentation, only the dynamic observer design for area 2 is presented here. However, a similar exercise would be carried out for area 1.

Assuming that the voltage angle at bus 3 is available as a measurement, the following equations can be obtained for the physical power system, given equations (9) and (10):

$$\dot{x}_{2,1} = x_{2,2}$$

$$M_3\dot{x}_{2,2} = -D_3x_{2,2} + (u_{2,1} - X_{13}x_{2,1} - X_{23}x_{2,1}) + X_{13}x_{1,1} + X_{23}x_{1,3}$$

$$y_2 = x_{2,1}. \quad (11)$$

And for the observer:

$$\dot{\hat{x}}_{2,1} = \hat{x}_{2,2} \quad (12)$$

$$M_3\dot{\hat{x}}_{2,2} = -D_3\hat{x}_{2,2} - (X_{13} + X_{23})x_{2,1} + \underbrace{X_{13}x_{1,1} + X_{23}x_{1,3}}_{(\text{not available} \rightarrow \text{to be modeled as "w"})} + u_{2,1} + L_2(y_2 - \hat{y}_2)$$

$$y_2 = \hat{x}_{2,1}.$$

Note that the terms $X_{13}x_{1,1}$ and $X_{23}x_{1,3}$ in equation (12) include quantities that are external to area 2, and thus these terms are not available to the sub-system model for area 2. These are thus modeled as unknown inputs or disturbance "w".

The error term for the model of area 2 is given by $e_2 = x_2 - \hat{x}_2$. The dynamics for the error term are given by:

$$\dot{e}_{2,1} = e_{2,2}$$

$$M_3\dot{e}_{2,2} = -D_3e_{2,2} - (X_{13} + X_{23})e_{2,1} + (X_{13}x_{1,1} + X_{23}x_{1,3}) - L_2e_{2,1}. \quad (13)$$

In a compact form, this can be represented as:

$$\underbrace{\begin{bmatrix} 1 \\ & M_3 \end{bmatrix}}_{M}\dot{e}_2 = \underbrace{\begin{bmatrix} 0 & 1 \\ -(X_{13} + X_{23}) - L_2 & -D_3 \end{bmatrix}}_{A-LC}e_2 + \underbrace{\begin{bmatrix} 0 \\ 1 \end{bmatrix}}_{E}\underbrace{(X_{13}x_{1,1} + X_{23}x_{1,3})}_{w}. \quad (14)$$

The transfer function $G_{ew}(s)$ corresponding to equation (14) can be tuned appropriately, using the value of $L_2$, such that the effects of the disturbance w are attenuated, where this unknown input aggregates the effects of the state estimates from other areas of the power system. The Scholtz and Lesieutre article and the Scholtz dissertation cited earlier may be consulted for details. This attenuation is required for making different areas practically independent of one another, so that their sub-system models can be processed in parallel using many-core hardware.

Referring to equations (6) and (14), the transfer function takes up the form:

$$G_{ew}(s)|_{s=0} = I(sM - A + LC)^{-1}E|_{s=0} = \begin{bmatrix} 0 \\ 1/\xi \end{bmatrix}, \text{ with } \xi \rightarrow \infty. \quad (15)$$

For the example at hand, and given equation (14):

$$G_{ew}(s)|_{s=0} = \begin{bmatrix} 0 \\ 1/(-(X_{13} + X_{23}) - L_2) \end{bmatrix}. \quad (16)$$

A large $L_2$, can achieve the goal of attenuating the effect of the disturbance. By an appropriate choice of $L_2$ (e.g., according to the graphical observer design techniques described in the Scholtz and Lesieutre article and the Scholtz dissertation), this objective can be accomplished independently of how the evolution of states in the other areas influences the evolution of the states in the area of interest. The result is that the estimate of state of area 2 converges to its actual state over time, as represented by:

$$\hat{x}_{2,\bullet} \xrightarrow{t\to\infty} x_{2,\bullet} \qquad (17)$$

Notice that once the observer is designed and the value of $L_2$ is identified, the observer as represented by equation (12) needs to be calculated and re-calculated in real-time (or faster than real time) to obtain the estimates $\hat{x}_{2,1}$, $\hat{x}_{2,2}$ of $x_{2,1}$, $x_{2,2}$ (that is, $\delta_3, \omega_3$). The real-time or faster-than-real-time integration of dynamic equations thus benefits from the subdividing of the system into smaller, more manageable sub-systems that can be independently modeled on separate processing elements of a multi-processor computing system, to speed the execution.

With the techniques described above, independent observers can be realized for each of several sub-systems of a power system network, facilitating the independent estimation or prediction of the dynamic state variables for each sub-system, or area. This enables dynamic state estimation of a large-scale power system network in a practical way. It is possible to split a system network into very small sections to exploit parallelism. With sufficient measurements available, the division of the electrical grid can be almost arbitrary. Hence the size of each area chosen might be dependent on the number of parallel computing units (e.g., cores, or machines) that are available. Practically speaking, the size of each sub-system in the division of the network will be a function of the number of measurements available from a potential subsystem as well as the locations of those measurements with the sub-system, as adequate measurements to ensure observability and unknown input suppression for each area are required. The upper limit is driven by the guaranteed computational performance available from the processing elements that will handle the real-time or near-real-time estimation or prediction of the sub-system's dynamic state variables.

Figure 4:
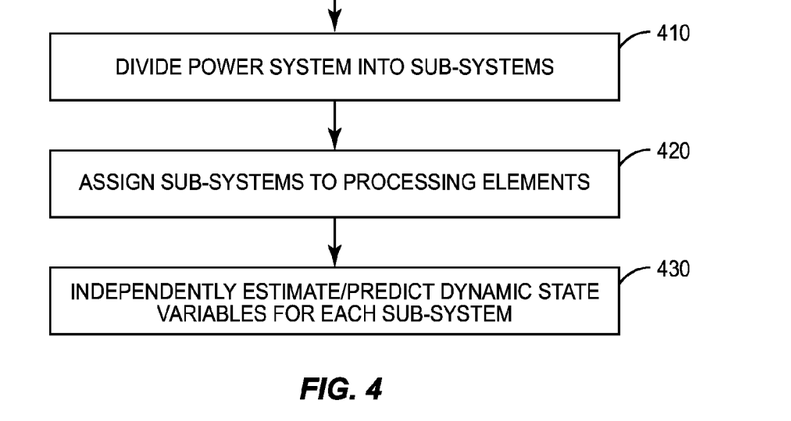
FIG. 4 is a process flow diagram illustrating an example method for monitoring a power system network.

FIG. 4 is a process flow diagram illustrating a general approach to monitoring the state of a power system network based on the techniques described above. The power system network includes one or more power generators, a plurality of power buses, and a plurality of monitoring sensors; in some cases the network may include hundreds of buses and many sensors.

As shown at block 410, the process begins with the dividing of the power system network into several sub-systems. This operation, which may be an "offline" process, a semi-automated process, or a fully automated process, in various embodiments, may be based on one or more of the following: the number of state variables in the power system network; the number and locations of monitoring sensors in each potential sub-system; the processing capability for one or all of the processing units; and the number of processing units available. The availability of measurements is important—with sufficient measurements available, the division of the power system network can almost be at will. In some cases, the size chosen might thus be dependent solely or primarily on the number of available parallel computing units (e.g. cores, or machines). If the number of available processing units is very large, then the size of each sub-system in the division can be a function of the number of measurements (to ensure observability and unknown input suppression) for each sub-system, and the guaranteed computational performance of the processing units.

Next, as shown at block 420, the sub-systems are individually assigned to each of a plurality of processing elements. These processing elements may be processor cores in a multi-processor apparatus, or distributed among two or more separate processing platforms, or some combination of both.

As discussed extensively above, each of the sub-systems has a plurality of associated dynamic state variables. The processing element allocated to each sub-system estimates or predicts the associated dynamic state variables for each sub-system at real-time speeds or faster, using the plurality of processing elements and measurements from the plurality of monitoring sensors. This is shown at block 430. As explained above, the estimating or predicting for each sub-system is independent of the estimating or predicting for the remaining sub-systems. In some embodiments, this estimating or predicting of the associated dynamic state variables for each sub-system involves modeling the sub-system using a dynamic observer, the dynamic observer including a designed-observer gain that attenuates effects on the estimated dynamic state variables from unknown state estimates for other sub-system. This dynamic observer may be a proportional integral (PI) dynamic observer, in some cases, or a linear parameter varying (LPV) dynamic observer in others. More particularly, the design of LPV dynamic observers for each of the sub-systems may be based on a graphical observer design approach, in some embodiments.

The above discussion distinguishes between "predicting" and "estimating" of dynamic state variables. In fact, this is not a rigid distinction. Instead, the term "estimating" is meant to refer to a process that calculates and updates the dynamic state variables in real time or near-real time, e.g., for system monitoring purposes. "Predicting," on the other hand, is meant to refer to a process that calculates and updates the state variables at faster than real time. This allows the user to look ahead and predict problems with the system. Of course, some monitoring systems may do some combination of predicting or estimating.

The results of the monitoring process illustrated in FIG. 4 and described above may be used in any of several ways. For example, the process described in FIG. 4 may further include the dynamic control of one or more parameters in the power system network based on the estimated or predicted dynamic state variables. Likewise, the process may also include alerting a system operator to a system disturbance based on the estimated or predicted dynamic state variables.

In some cases, the process of FIG. 4 may be performed in an iterative fashion, with periodic or occasional revisions of the system division and/or assignments of sub-systems to processing elements. Thus, for example, the process of FIG. 4 may be followed by a re-division of the power system network to obtain re-divided sub-systems, the re-dividing reflecting changes in sensor locations or changes in the availability of measurements from sensors, or both. The re-divided sub-systems are then assigned to the processing elements, which then estimate or predict the associated dynamic state variables for each re-divided sub-system at real-time speeds or faster, using the plurality of processing elements and measurements from the plurality of monitoring sensors. Once again, of course, the estimating for each re-divided sub-system is independent of the estimating or predicting for the remaining re-divided sub-systems.

Figure 5:
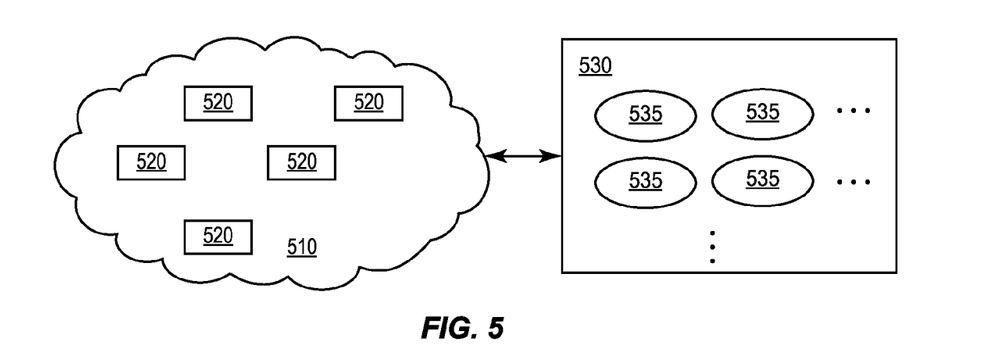
FIG. 5 is a block diagram illustrating components of an apparatus for monitoring a power system network.
Figure 6:
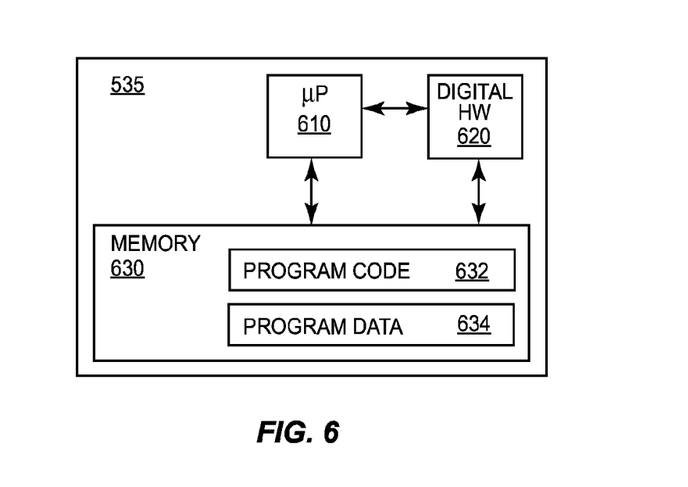
FIG. 6 illustrates an example processing circuit.

FIGS. 5 and 6 are block diagrams illustrating basic features of a computerized system for monitoring the state of a power system network according to the techniques described above. The system includes a number of monitoring sensors 520, which are distributed throughout the monitored network 510.

The system further includes several processing elements 535, which are configured to receive measurements from the monitoring sensors 520. In the example system illustrated in FIG. 5, these processing elements 535 are separate processing cores in a multi-core/many-core processing platform 530. However, in other embodiments the processing elements 535 may be distributed among two or more physically distinct processing platforms, one or more of which may itself be a multi-core platform. In either case, however, each processing element 535 is configured to have assigned to it a sub-system of the power system network 510, each sub-system having a plurality of associated dynamic state variables. Each processing element 535 is further configured to estimate or predict the associated dynamic state variables for the sub-system at real-time speeds or faster, using measurements from the monitoring sensors, independently of the estimating or predicting for the remaining sub-systems.

FIG. 6 is a block diagram illustrating an example configuration for a processing element 535. The pictured example includes one or more microprocessors or microcontrollers 610, as well as other digital hardware 620, which may include digital signal processors (DSPs), special-purpose digital logic, and the like. Either or both of microprocessor(s) 610 and digital hardware 620 may be configured to execute program code 632 stored in memory 630 along with program data 634. Again, because the various details and engineering tradeoffs associated with the design of processing circuits are well known and are unnecessary to a full understanding of the invention, additional details are not shown here.

The program code 632 stored in memory circuit 630, which may comprise one or several types of memory such as read-only memory (ROM), random-access memory, cache memory, flash memory devices, optical storage devices, etc., includes program instructions for carrying out the sub-system estimation/prediction techniques described above, in several embodiments. The program data 634 include various pre-determined system configuration parameters as well as parameters determined from system measurement.

In some embodiments of a monitoring system like the one pictured in FIGS. 5 and 6, the processing elements 535 are configured to estimate the associated dynamic state variables for each sub-system by modeling the sub-system using a dynamic observer, the dynamic observer including a designed-observer gain that attenuates effects on the estimated dynamic state variables from unknown state estimates for other sub-system. In some cases, the dynamic observer is a proportional integral (PI) dynamic observer. In others, the dynamic observer is a linear parameter varying (LPV) dynamic observer.

In some embodiments, one or more of the processing elements 535 or a separate processing unit is configured to design the LPV dynamic observer for each of the sub-systems using a graphical observer design approach. In many cases this design process is performed "off-line," i.e., ahead of time and/or using a completely distinct processing platform. However, an adaptive approach is also possible, where one or more processing units closely coupled to the processing elements 535 is engaged in designing and/or re-designing the LPV dynamic observer for one or more of the sub-systems.

Some systems further include a sub-system identification processor (not shown in FIG. 5) configured to divide the power system network into a plurality of sub-systems, based on the number of available processing elements. In some cases, the sub-system identification processor is configured to select the number of sub-systems to match a number of available processing elements. Some systems still further include a scheduling processor configured to assign sub-systems to processing elements. This assigning may be based on one or more of the following, in various embodiments: the number of sub-systems; the number of monitoring sensors for each of one or more of the sub-systems; and the processing capabilities of each of one or more of the processing elements.

It should be appreciated that the techniques described above can be employed to solve several problems related to the estimation of dynamic states of a power system. First, this estimation can be computationally demanding for power systems of any appreciable size, due to the size of the mathematical problem that needs to be repeatedly solved, in real time. The techniques described above make use of independent (parallel) processing that alleviates this obstacle and presents a practical solution.

Of course, it should be understood that the present invention is not limited by the foregoing description, nor is it limited by the accompanying drawings. Instead, the present invention is limited only by the following claims and their legal equivalents.

With these and other variations and extensions in mind, those skilled in the art will appreciate that the foregoing description and the accompanying drawings represent non-limiting examples of the systems and apparatus taught herein. As such, the present invention is not limited by the foregoing description and accompanying drawings. Instead, the present invention is limited only by the following claims and their legal equivalents.

What is claimed is:

1. A method for monitoring the state of a power system network that includes one or more power generators, a plurality of power buses, and a plurality of monitoring sensors, the method comprising:
   dividing the power system network into a plurality of sub-systems;
   assigning each of one or more of the sub-systems to one or more of a plurality of processing elements, each sub-system having a plurality of associated dynamic state variables; and
   estimating or predicting the associated dynamic state variables for each sub-system at a least real-time speeds using the plurality of processing elements and measurements from the plurality of monitoring sensors, such that the estimating or predicting for each sub-system is independent of the estimating or predicting for the remaining sub-systems.

2. The method of claim 1, wherein said dividing of the power system network into the first plurality of sub-systems is based on one or more of the following:
   the number of state variables in the power system network;
   the number and locations of monitoring sensors in each potential sub-system;
   a processing capability for one or more of the processing units; and
   a number of processing units available.

3. The method of claim 1, wherein said estimating or predicting the associated dynamic state variables for each sub-system comprises modeling the sub-system using a dynamic observer, the dynamic observer including a designed-observer gain that attenuates effects on the estimated dynamic state variables from unknown state estimates for other sub-systems.

4. The method of claim 3, wherein the dynamic observer comprises a proportional integral (PI) dynamic observer.

5. The method of claim 3, wherein the dynamic observer comprises a linear parameter varying (LPV) dynamic observer.

6. The method of claim 5, further comprising designing the LPV dynamic observer for each of the sub-systems using a graphical observer design approach.

7. The method of claim 1, further comprising selecting the number of sub-systems to match a number of available processing elements.

8. The method of claim 1, wherein two or more of the processing elements are processor cores in a multi-processor apparatus.

9. The method of claim 1, wherein two or more of the processing elements are distributed among two or more processing platforms.

10. The method of claim 1, further comprising dynamically controlling one or more parameters in the power system network based on the estimated or predicted dynamic state variables.

11. The method of claim 1, further comprising alerting a system operator to a system disturbance based on the estimated or predicted dynamic state variables.

12. The method of claim 1, further comprising:
re-dividing the power system network to obtain re-divided sub-systems, wherein said re-dividing reflects changes in sensor locations or the availability of measurements from sensors, or both;
assigning each of the re-divided sub-systems to the processing elements; and
estimating or predicting the associated dynamic state variables for each re-divided sub-system at a least real-time speeds, using the plurality of processing elements and measurements from the plurality of monitoring sensors, such that the estimating or predicting for each re-divided sub-system is independent of the estimating or predicting for the remaining re-divided sub-systems.

13. A computerized system for monitoring the state of a power system network that includes one or more power generators and a plurality of power buses, the computerized system comprising:
a plurality of monitoring sensors distributed through the power system network; and
a plurality of processing elements, wherein each processing element is configured to have assigned to it a sub-system of the power system network, each sub-system having a plurality of associated dynamic state variables, wherein each processing element is configured to estimate the associated dynamic state variables for the sub-system at a least real-time speeds using the measurements from the plurality of monitoring sensors, and such that the estimating for each sub-system is independent of the estimating for the remaining sub-systems.

14. The computerized system of claim 13, further including a sub-system identification processor configured to divide the power system network into a plurality of sub-systems, based on a number of available processing elements.

15. The computerized system of claim 14, wherein the sub-system identification processor is configured to select the number of sub-systems to match a number of available processing elements.

16. The computerized system of claim 13, further comprising a scheduling processor configured to assign sub-systems to processing elements, wherein said assigning is based on one or more of the following:
the number of sub-systems;
the number of monitoring sensors for each of one or more of the sub-systems; and
the processing capabilities of each of one or more of the processing elements.

17. The computerized system of claim 13, wherein the processing elements are configured to estimate the associated dynamic state variables for each sub-system by modeling the sub-system using a dynamic observer, the dynamic observer including a designed-observer gain that attenuates effects on the estimated dynamic state variables from unknown state estimates for other sub-systems.

18. The computerized system of claim 17, wherein the dynamic observer comprises a proportional integral (PI) dynamic observer.

19. The computerized system of claim 17, wherein the dynamic observer comprises a linear parameter varying (LPV) dynamic observer.

20. The computerized system of claim 19, wherein the processing elements are configured to design the LPV dynamic observer for each of the sub-systems using a graphical observer design approach.

21. The computerized system of claim 13, wherein two or more of the processing elements are processor cores in a multi-processor apparatus.

22. The computerized system of claim 13, wherein two or more of the processing elements are distributed among two or more processing platforms.

* * * * *